(12) United States Patent
Skiba

(10) Patent No.: US 7,112,379 B2
(45) Date of Patent: Sep. 26, 2006

(54) VACUUM ASSISTED STARTUP OF A FUEL CELL AT SUB-FREEZING TEMPERATURE

(75) Inventor: Tommy Skiba, East Hartford, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 151 days.

(21) Appl. No.: 10/429,352

(22) Filed: May 5, 2003

(65) Prior Publication Data

US 2004/0224191 A1    Nov. 11, 2004

(51) Int. Cl.
H01M 8/00 (2006.01)
H01M 8/04 (2006.01)
H01M 8/10 (2006.01)
H01M 2/00 (2006.01)

(52) U.S. Cl. .................. 429/13; 429/32; 429/23; 429/22; 429/34

(58) Field of Classification Search .............. 429/13, 429/32, 23, 22, 34
See application file for complete search history.

(56) References Cited

U.S. PATENT DOCUMENTS

| | | | |
|---|---|---|---|
| 5,798,186 A * | 8/1998 | Fletcher et al. | 429/13 |
| 6,479,177 B1 * | 11/2002 | Roberts et al. | 429/13 |
| 6,673,481 B1 * | 1/2004 | Reiser et al. | 429/13 |
| 2003/0039872 A1 * | 2/2003 | Grasso et al. | 429/24 |

* cited by examiner

Primary Examiner—Patrick Joseph Ryan
Assistant Examiner—Angela J. Martin
(74) Attorney, Agent, or Firm—M P. Williams

(57) ABSTRACT

A vehicle (150) includes a fuel cell stack (151) started below freezing, by connection (158) to the vehicle propulsion system (159) within a few seconds of starting the flow of fuel (179) and oxidant (173), or when open circuit voltage (155, 156) is detected. The fuel in excess of stochiometry requirement and the oxidant in excess of at least twice stochiometric requirement, are at atmospheric pressure and at 4 kPa (0.6 psi) or more above the pressure of any water in said water passages due to a water passage vacuum pump 205, and may be below freezing. Water transport plates (84, 86, 88, 89) have water passages connected to a water circulation loop (170) including a reservoir (164) having an auxiliary heater (161) connected (160) to the stack. Warming of cell stack materials and ice in the water transport plates, heat of fusion of melting ice, warming of melted water, and evaporative cooling of water melted in the water transport plates keep the stack cool until liquid coolant is circulated.

4 Claims, 2 Drawing Sheets

VACUUM ASSISTED STARTUP OF A FUEL CELL AT SUB-FREEZING TEMPERATURE

TECHNICAL FIELD

This invention relates to rapidly initiating operation of a fuel cell power plant at sub-freezing temperature, in which product water is removed by drawing it into the water transport plates by means of a vacuum.

BACKGROUND ART

It is generally agreed that one difficulty with utilizing fuel cells to power the propulsion system of electric vehicles is the requirement that such vehicles be operable at temperatures below that at which water will freeze. Freezing provides potential mechanical damage as a consequence of the expansion of ice, and presents problems due to the inseparability of water and the fuel cell processes. Heretofore, various methods of initiating operation of a fuel cell, preparatory to the operation of an electric vehicle, have concentrated on providing heat, either by reaction or combustion of fuel, or by means of battery power, to various water and other coolant conduits and reservoirs. Other efforts are directed toward processes designed to accelerate the rate at which a fuel cell stack will heat up to above-freezing temperatures, as a consequence of its own operation.

In copending U.S. patent application Ser. No. 10/390,439 filed Mar. 17, 2003, a PEM fuel cell stack at subfreezing temperature is connected to a vehicle propulsion system or other electric load within a few seconds or as soon as the stack provides open circuit voltage. According to the invention, the fuel cell stack is started with more than a stochiometric flow of fuel and at least stochiometric flow of oxidant, which may be at subfreezing temperatures, or not, whereby to prolong operation without localized heating, thereby permitting the vehicle (or other load) to be used during the time that the apparatus and fluids are being heated to suitable, operational temperatures.

In one known type of PEM fuel cells, the coolant water is managed through porous water transport plates, and by recirculating the water through a restriction, the water is caused to be at between 7 and 21 kPa (1 to 3 psi) below the pressure of the reactants, which are typically at atmospheric pressure. This ensures that water will not pool in the reactant gas channels, that the water is forced into the water channels, and that the hydrophilic substrates will not be flooded and will have sufficient open porosity to permit reactant diffusion. However, when freezing temperatures are encountered, the water in the reactant channels, coolant channels, water pump and other conduits of the water circulatory system is drained upon shutdown of the fuel cell system; upon startup, there is no circulating water so there is no way to maintain negative pressure in the water channels. Therefore, water can build up in the reactant channels.

In one embodiment of said copending application, at least one of the reactant gases is provided to the fuel cell stack at a pressure of at least about 4 kPa (0.6 psi) above the pressure of any water in the water channels, which typically will be about atmospheric pressure. This prevents liquid water from pooling in the reactant channels, and flooding the electrode substrates, which is particularly important in the oxidant gas reactant channel where product water can accumulate.

DISCLOSURE OF INVENTION

Objects of the invention include: operating, at subfreezing temperature, a fuel cell stack without flooding of the cathode; improved initiation of fuel cell operation at subfreezing temperature; initiating fuel cell operation at subfreezing temperature without pressurizing the reactant gases; and avoiding the need for reactant pressure above atmospheric when starting a frozen fuel cell stack.

Other objects, features and advantages of the present invention will become more apparent in the light of the following detailed description of exemplary embodiments thereof, as illustrated in the accompanying drawing.

MODE(S) FOR CARRYING OUT THE INVENTION

The invention may be used with a wide variety of fuel cell stacks, having fuel cells of various configurations.

Figure 1:
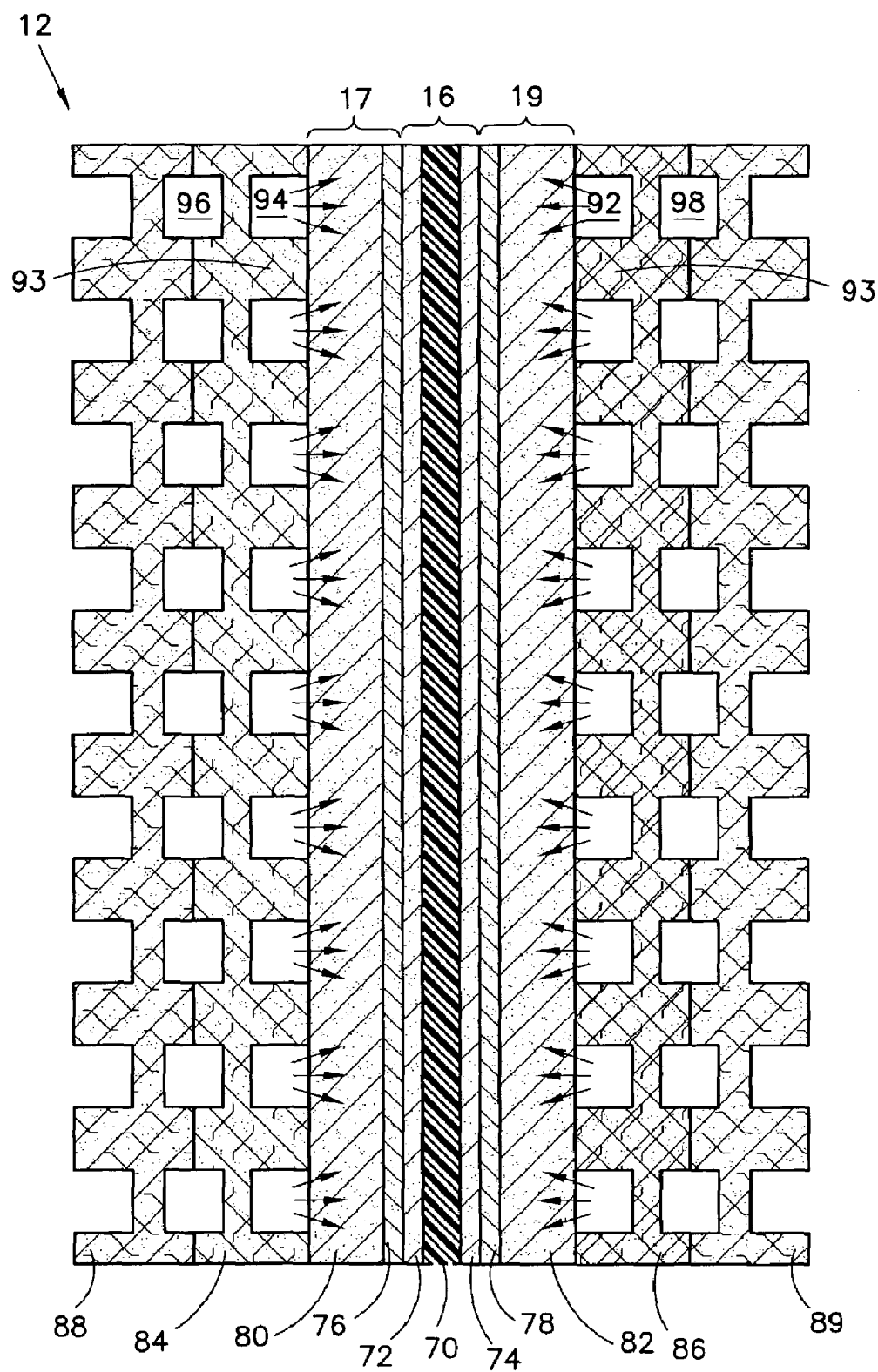
FIG. 1 is a simplified, sectioned side elevation of slightly more than one fuel cell which may be part of a stack with which the present invention may be practiced.

According to the invention, when starting a PEM fuel cell stack at below-freezing temperatures, the water in at least one of the reactant gas flow fields is drawn into porous water transport plates by means of a vacuum created in the water flow channels of the fuel cells. Referring to FIG. 1, there is shown a cross sectional view of a typical fuel cell 12, which includes a membrane electrode assembly (MEA) 16, an anode support plate 17 and a cathode support plate 19. The MEA 16 comprises a polymer electrolyte membrane ("PEM") 70, an anode catalyst 72 and a cathode catalyst 74. The anode catalyst 72 and the cathode catalyst 74 are secured on opposite sides of the PEM 70.

The anode support plate 17 and cathode support plate 19 may include hydrophobic diffusion layers 76, 78 and hydrophilic substrate layers 80, 82. The anode diffusion layer 76 is adjacent to a side of the anode catalyst 72, and the anode substrate layer 80 is adjacent to the anode diffusion layer 76 opposite the anode catalyst 72. The anode diffusion layer 76 and the hydrophilic anode substrate layer 80 allow the fuel reactant gas, which passes through a passageway 94 in a water transport plate 84, and the water, which passes through a passageway 96, to reach the anode catalyst 72. In the general case, the water passageways may be adjacent to the plate that provides the reactant gas passages. The fuel cell 12 also includes a hydrophobic cathode diffusion layer 78 and a hydrophilic cathode substrate layer 82, which allow the oxidant reactant gas passing through a passageway 92 in a water transport plate 86 to reach the cathode catalyst 74. The cathode diffusion layer 78 is adjacent to a side of the cathode catalyst 74, and the cathode substrate layer 82 is adjacent to the cathode diffusion layer 78 opposite the cathode catalyst 74. The hydrophobic cathode diffusion layer 78 and the hydrophilic cathode substrate layer 82 also allow the product water, which forms in the cathode catalyst 74, to migrate toward the water transport plate 86.

The diffusion layers 76, 78 are applied to both the anode and cathode substrate layers 80, 82, within the anode support plate 17 and cathode support plate 19, by procedures well known in the art. One procedure is described in U.S. Pat. No.

4,233,181. The diffusion layers 76, 78 are typically constructed of porous conductive layers that are rendered hydrophobic or partially hydrophobic by means of a hydrophobic polymer.

As shown in FIG. 1, the anode water transport plate 84 is adjacent to the anode support plate 17, and the cathode water transparent plate 86 is adjacent to the cathode support plate 19. The anode and cathode water transport plates 84, 86 may be structured and/or oriented to cooperate with adjacent water transport plates 88, 89 such that the passageways 96 and 98 simultaneously serve as the coolant stream for both the anode of one cell and cathode of the next cell.

The water transport plates 84, 86, 88, 89 are typically porous graphite having a mean pore size of approximately two (2) to three (3) microns and a porosity of about 35% to 40%. It is preferable to make the water transport plates 84, 86, 88, 89 hydrophilic by treating them with tin oxide ($SnO_2$) such as described in U.S. Pat. No. 5,840,414, which is owned by the assignee of the present invention and hereby incorporated by reference.

The hydrophilic porous nature of the cathode water transport plate 86, in conjunction with a negative pressure differential between the coolant and oxidant reactant gas streams, ensures proper removal of the product water formed at the cathode. Specifically, the water flows from the cathode support plate 19, through the water transport plate 86 and into the coolant passageways 98. Also, the anode water transport plate 84 furnishes the anode support plate 17 with a continuous supply of water, which eventually reaches the PEM and prevents it from becoming dry.

Alternatively, a fuel cell may differ from the fuel cell 12 in FIG. 1, in that the anode support plate may include a hydrophilic substrate layer but not include a diffusion layer. Not using a diffusion layer on the anode support plate further increases the performance capability of the fuel cell by removing all hydrophobic or partially hydrophobic barriers to the transport of liquid water from the anode water transport plate 84 to the anode catalyst 72.

In another alternative, a fuel cell which may be used with the present invention may have interdigitated reactant passageways within the substrate layers, rather than in the water transport plates thereby allowing the reactant gas streams to pass directly into and through the substrate layer. Whether the reactant gas passageways have a conventional or serpentine flow-through configuration or interdigitated configuration, the water transport plates include additional grooves on their opposite side. When this opposite side abuts another water transport plate, or any other plate, these grooves serve as passageways for the coolant stream to pass therethrough. Additionally, when the anode and cathode water transport plates abut each other and these grooves align, these grooves jointly create a single coolant stream passageway that serves as water transport plates for both the anode of one cell and the cathode of an adjacent cell.

The fuel cell stack may have solid separator plates between fuel cells disposed between the anode water transport plates 84, 89 and the cathode water transport plates 86, 88. Or, each cell may be separated from an adjacent cell by solid separator plates having coolant channels therein, as shown in U.S. patent application Ser. No. 10/036,181, filed Dec. 28, 2001. The coolant channels would similarly be placed, at every fourth or so fuel cell, between an anode water transport plate, such as one of the plates 84, 89, and a cathode water transport plate, such as one of the transport plates 86, 88, of an adjacent fuel cell. In the case of coolant plates between adjacent cells or occasionally interspersed in the stack, the coolant therein may either be antifreeze solution, or it may be water. In the usual case, if separate coolant channels are utilized, antifreeze may typically be used so as to simplify the handling of coolant in climates which are below the freezing temperature of water.

There are additional configurations disclosed in U.S. patent application Ser. No. 09/733,133, filed Dec. 8, 2000, with which the invention may be used.

The invention may also be used with passive water management fuel cells, such as that disclosed in the aforementioned application Ser. No. 10/036,181, in which the ends of water channels adjacent to corresponding reactant gas inlet manifolds are dead ended, and the other ends of the water channels drain excess water into a related reactant gas exhaust manifold.

Figure 2:
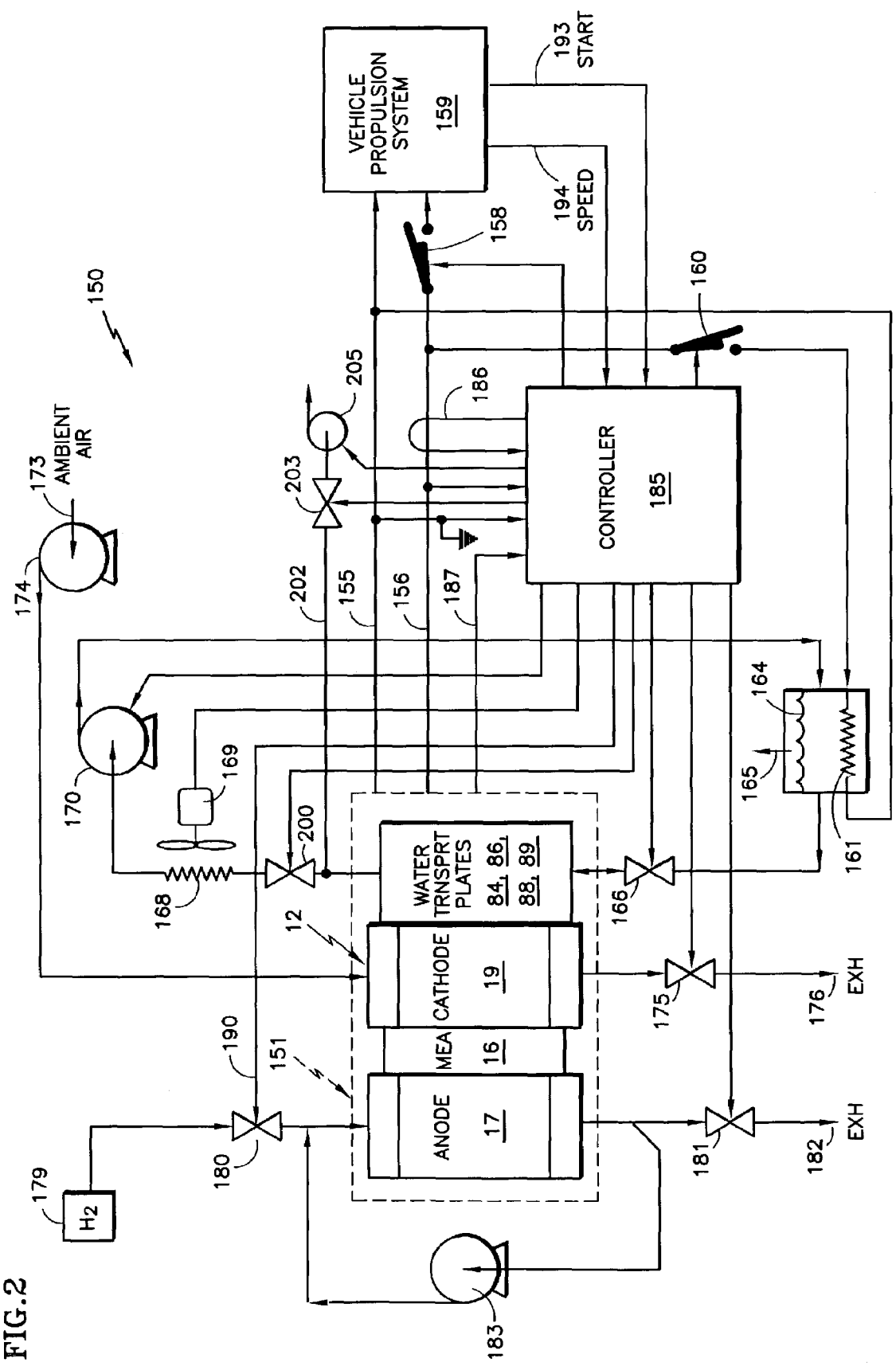
FIG. 2 is a schematic illustration of a vehicle engine propulsion system, including a fuel cell stack by which it is powered, which may practice the present invention.

Referring now to FIG. 2, a vehicle 150 includes a fuel cell stack 151 comprising a plurality of contiguous fuel cells, only one fuel cell 12 being shown in FIG. 2. The electrical output at the positive and negative terminals of the fuel cell stack 151 is connected by a pair of lines 155, 156 through a switch 158 to a vehicle propulsion system 159. The output is also connected through a switch 160 to an auxiliary heater 161 in a reservoir 164 of a water circulation system, the reservoir having a vent 165. The water circulation system may include a trim valve 166, water passages, such as those within water transport plates 84, 86, 88, 89, a radiator and fan 168, 169 which is selectively operable to cool water circulating in the system, and a water pump 170. Ambient air at an inlet 173 is provided by a pump, such as a blower 174, to the oxidant reactant gas flow fields of the cathode 19, and thence through a pressure regulating valve 175 to exhaust 176. Hydrogen is supplied from a source 179 through a flow regulating valve 180 to the fuel reactant gas flow fields of the anode 17, and thence through a pressure regulating valve 181 to exhaust 182. A fuel recycle loop includes a pump 183.

A controller 185 responds to load current determined by a current detector 186 as well as to the voltage across the lines 155, 156; it may also have temperature of the stack provided on a line 187. The controller, in turn, can control the valve 180 over a line 190 as well as controlling the other valves, the switches 158, 160 and the pumps 174, 170, as shown in FIG. 2.

The controller 185 responds to start and speed control signals from the vehicle propulsion system 159 on lines 193 and 194, which will indicate when the fuel cell should commence operation, and the amount of power being demanded by the vehicle propulsion system.

It is assumed that the vehicle propulsion system will be started up in a condition in which at least a portion of the fuel cell stack 151 is below the freezing temperature of water. When that is the case, the entire vehicle may be in an ambient environment which is below the freezing temperature of water. It is further assumed, for the explanation that follows, that the fuel cell stack has had substantially all of the water in the porous support plates and the reactant gas flow fields removed, which may be achieved in accordance with a procedure disclosed in U.S. patent application Ser. No. 09/826,739, filed Apr. 5, 2001. Thus, there will likely be ice in the PEM, in the anode and cathode catalyst layers, as well as within the pores of the water transport plates. However, it should be borne in mind that the water transport plates themselves can hold ice within the pores without doing damage to the water transport plates, as in the case for the PEM. Furthermore, the substrates 80, 82 (FIG. 1) are sufficiently close to the PEM itself (as seen in FIG. 1) that the temperature of the water that is transferred into the substrates will very nearly follow the temperature of the PEM, rather than the temperature of the reactant gases themselves. Thus, even though the water transport plates have ice in the pores thereof, product water will not freeze in the substrates due to the transient heat transfer characteristic of the membrane electrode assembly.

According to the invention, a valve 200 is provided so as to be able to isolate the water transport plates 84, 86, 88, 89 in conjunction with the valve 166. Additionally, a line 202 is provided to a valve 203, which in turn is connected to a small vacuum pump 205. During initial startup, with the valves 166 and 200 closed, and the valve 203 open and the vacuum pump 205 operating, any water formed adjacent to the cathode will be drawn into the water transport plates. The pressure of the reactant gases will be above the pressure in the water channels by at least 4 kPa (0.6 psi) and preferably 4 to 21 kPa (0.6–3 psi), due to the vacuum in the water channels. The pressure differentials are measured between the reactant exhaust manifolds and the water inlet manifold of the stack.

Whenever a start signal is sent from the vehicle propulsion system 159 over the line 193 to the controller 185, signals from the controller will cause the valves 166 and 200 to be closed, the valve 203 to be open and the pump 205 to run. Also, the valves 180, 181 and the pump 183 will be operated appropriately so as to provide fuel reactant gas to the flow fields of the anode 17, and the valve 175 and pump 174 will be operated appropriately to provide ambient air to the flow fields of the cathode 19. Initially, more than a stochiometric amount of hydrogen based on current density during startup will be provided to the anode 17. Similarly, at least twice the stochiometric amount of air is provided initially; preferably an amount up to about five times stochiometric requirement of air is initially provided. The more air that is provided, the more uniform will be the current distribution among the various cells of the stack 151.

When fuel and air of sufficient quantity have been provided uniformly to the cells, open circuit voltage will be detected on the lines 155, 156 by the controller 185. At that time, the controller 10 closes the switch 158 so as to connect the fuel cell stack 151 to the vehicle propulsion system 159. Optionally, the controller 185 may also close the switch 160 at the same time so as to connect the fuel cell stack to an auxiliary load, which may comprise the heater 161 in the reservoir 164, which will start to melt some of the ice in the reservoir 164. With the fuel cell stack providing power to the loads, heat produced by the reactions within the fuel cell stack causes the fuel cell stack materials and the ice to begin warm up.

When the temperature of the stack reaches about 0° C. (32° F.), the heat generated by the stack is absorbed as the heat of fusion of the ice within the stack, substantially all of which is in the water transport plates. In fact, the water transport plates may have as much as 10 or 20 times more ice than the PEM, causing the temperature of the stack to remain at 0° C. out to nearly three minutes after startup, depending upon the power level. After about two and one-half minutes, heat generated by the operation of the stack is absorbed as sensible heat by the materials of the stack and the water inside the stack. Then, evaporative cooling begins to occur.

Although the air and hydrogen that are being brought into the stack may be very cold, and even below the freezing temperature of water, as the gases pass through the flow fields, they rapidly warm up and after about three and one-half minutes, will begin evaporating product water and water in the water transport plates into the gas streams, thereby providing cooling to the cell stack. During the entire initial time that the cell stack is operating, up to about seven and one-half minutes, the stack is relying on air cooling and primarily evaporative cooling to prevent excessive local heating at any point within the stack.

At about seven and one-half minutes after initiating stack operation, there typically will be sufficient liquid water in the reservoir 164 to fill the water circulating system. The controller then opens valves 166 and 200, closes valve 203, shuts off the pump 205, and turns on the pump 170. Water then passes from the tank through the valve 166, through the water transport plates, through the valve 200 and the radiator 168, the pump 170 and back to the reservoir 164. Although there may not be sufficient water to replace all of the ice in the reservoir 164 at this time, that is not, however, necessary. Therefore, circulation of water flowing within the water circulation system, including the water passages in the cell stack, can begin, and suitable negative water pressure will be achieved through adjustment of the valve 166 by the controller 185. Thereafter, liquid cooling of the cell stack, as in normal cell stack operation, will take place.

Note that the vehicle was placed in condition for operation within about 15 seconds of starting the flow of reactant gases into the stack; the stack was maintained in a sufficiently cool state by the heat of fusion of the melting ice in the water transport plates, by the heating up of the mass of the stack and water, and by the evaporation of water from the water transport plates into the reactant gases, particularly the oxidant reactant gas (air).

All of the aforementioned patents and patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method of initiating operation of an electric load powered by a proton exchange membrane (PEM) fuel cell stack at least part of which is at a temperature below the freezing temperature of water, said stack having a plurality of cells and having water passages connected to a water circulation system to provide at least one of (i) product water removal (ii) condensate removal (iii) humidification of reactants, and (iv) cooling, each of said cells including a MEA disposed between an anode support plate and a cathode support plate, a fuel reactant gas flow field on an anode side of said cell, and an oxidant reactant gas flow field on a cathode side of said cell, said method comprising:
   (a) monitoring the current provided by and voltage across said stack;
   (b) evacuating said water passages so as to provide the pressure of any water in said water passages at least 4kPa (0.6 psi) below the pressure of said reactant gases;
   (c) with said stack disconnected from said load, providing at least stochiometric requirement of fuel reactant gas to said fuel flow fields and at least stochiometric requirement of oxidant reactant gas to said oxidant flow fields; and
   (d) after said step (c), connecting said stack to power said load.

2. A method according to claim 1 further comprising:
   (e) after said step (d), starting circulation of water flowing within said water passages.

3. Apparatus comprising:

an electric load;

a proton exchange membrane (PEM) fuel cell stack at least part of which is at a temperature below the freezing temperature of water, said stack having a plurality of cells and having water passages connected to a water circulation system, to provide at least one of (i) product water removal (ii) condensate removal (iii) humidification of reactants, and (iv) cooling, each of said cells Including a MEA disposed between an anode support plate and a cathode support plate, a fuel reactant gas flow field on an anode side of said cell, and an oxidant reactant gas flow field on a cathode side of said cell;

(a) means for monitoring the current provided by and voltage across said stack;

(b) means for evacuating said water passages so as to provide the pressure of any water in said water passages at least 4kPa (0.6 psi) below the pressure of said reactant gases;

(c) means for providing at least stochiometric requirement of fuel reactant gas to said fuel flow fields and at least stochiometric requirement of oxidant reactant gas to said oxidant flow fields with said stack disconnected from said load; and (d) means for connecting said stack to power said load after said reactant gases are provided to said stack.

4. Apparatus according to claim 3 further comprising:

(e) means for starting circulation of water flowing within said water passages after connecting said stack to said load.

* * * * *